United States Patent
Moser et al.

(10) Patent No.: US 7,611,559 B2
(45) Date of Patent: Nov. 3, 2009

(54) FILTER ELEMENT

(75) Inventors: Nikolaus Moser, Ditzingen (DE); Andreas Beck, Ludwigsburg (DE); Josef Rohrmeier, Laberweinting (DE); Matthaeus Huber, Resibach (DE); Markus Kolczyk, Mundelsheim (DE); Michael Durst, Frankenhardt (DE); Yves Klett, Dauchingen (DE); Klaus Drechsler, Feldkirchen (DE); Rainer Kehrle, Stuttgart (DE)

(73) Assignees: Mann & Hummel GmbH, Ludwigsburg (DE); Universitaet Stuttgart Institut fuer Flugzeugbau, Stuttgart (DE)

( * ) Notice: Subject to any disclaimer, the term of this patent is extended or adjusted under 35 U.S.C. 154(b) by 364 days.

(21) Appl. No.: 11/703,235

(22) Filed: Feb. 7, 2007

(65) Prior Publication Data

US 2007/0199286 A1    Aug. 30, 2007

(30) Foreign Application Priority Data

Feb. 7, 2006    (DE) .................. 20 2006 002 014 U

(51) Int. Cl.
*B01D 27/06* (2006.01)
(52) U.S. Cl. .............................. 55/500; 55/498; 55/521; 55/529; 55/DIG. 42; 55/361; 55/380; 55/381; 210/493.5; 210/509; 210/483; 210/487; 210/493.2; 210/493.3; 210/493.4; 210/510.1

(58) Field of Classification Search .................. 55/500, 55/498, 521, 529, DIG. 42, 361, 380, 381; 210/493.5, 509, 483, 487, 493.2, 493.3, 493.4, 210/510.1
See application file for complete search history.

(56) References Cited

U.S. PATENT DOCUMENTS

| | | | |
|---|---|---|---|
| 2,556,521 A | | 6/1951 | Chase |
| 2,654,440 A | * | 10/1953 | Robinson ..................... 210/347 |
| 3,491,891 A | * | 1/1970 | Krizman, Jr. ................. 210/483 |
| 4,200,444 A | * | 4/1980 | Witchell ....................... 55/484 |
| 4,640,779 A | * | 2/1987 | Taki et al. ................. 210/493.5 |
| 5,851,250 A | * | 12/1998 | Sugie et al. ................... 55/523 |

FOREIGN PATENT DOCUMENTS

DE    27 25 437 A1    12/1978

* cited by examiner

*Primary Examiner*—Duane Smith
*Assistant Examiner*—Minh-Chau T Pham
(74) *Attorney, Agent, or Firm*—Crowell & Moring LLP

(57) ABSTRACT

A filter element (1) with a tubular folded bag (2) of folded filter material, which has a plurality of fold blades (3) adjacent each other in the longitudinal direction (10) of the folded bag (2) a closure cover (4) is attached at at least one axial end (7) of the folded bag (2). In order to provide a filter element which can be bent to any desired curved form while maintaining a high degree of filtration performance, and can be produced in a cost effective manner, the fold blades (3) of a folded bag (2) are provided with a combination of diagonal folds extending at an angle relative to each other such that the fold blades (3) in the longitudinal direction (10) of the folded bag extend back and forth and thereby form a three-dimensional crown structure (18). At least the outer margin of the closure cover (4) has a form corresponding to the crown structure (18) of the fold blades (3).

11 Claims, 5 Drawing Sheets

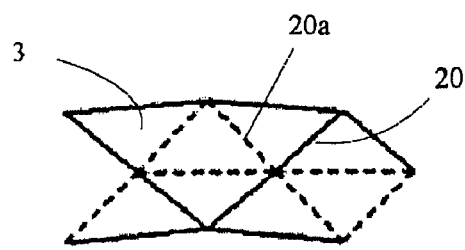
Fig. 4
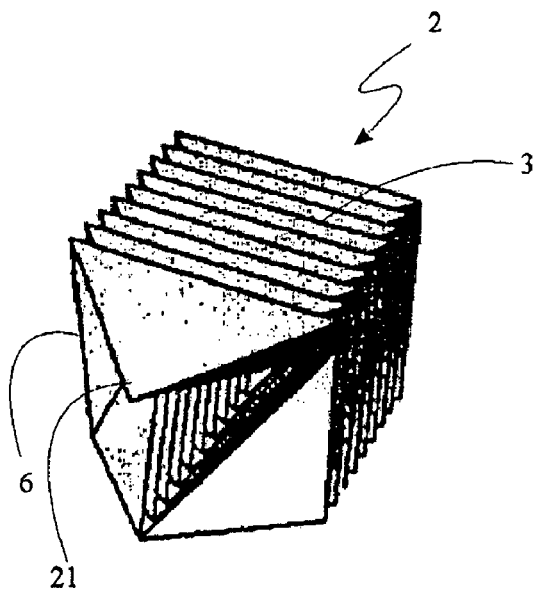
Fig. 3
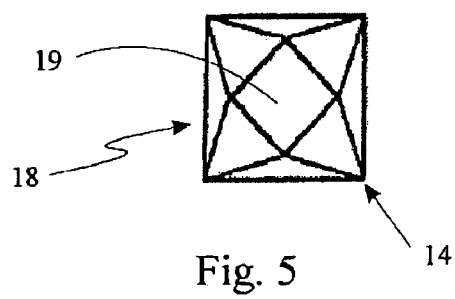
Fig. 5
Fig. 8
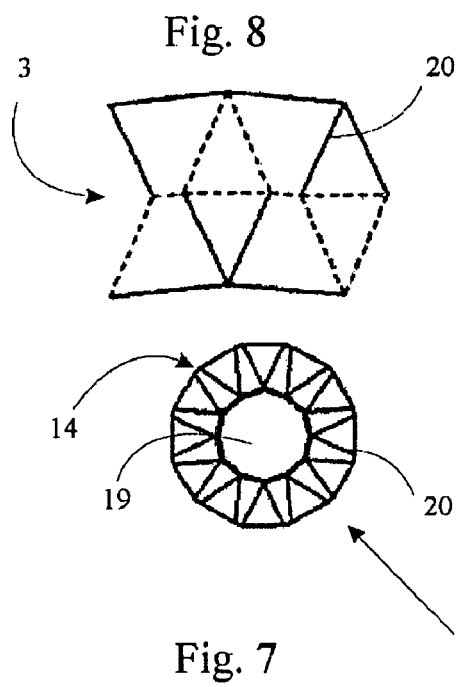
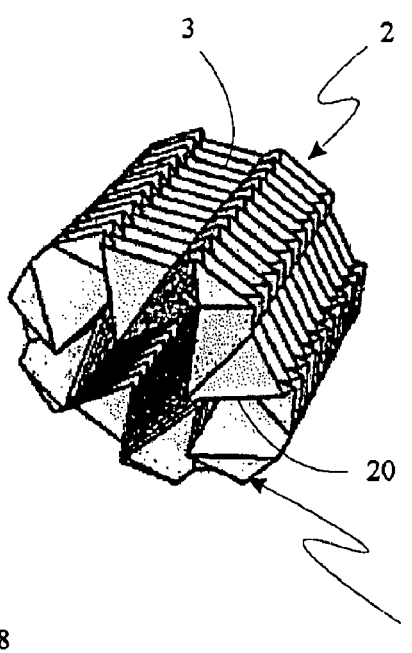
Fig. 6
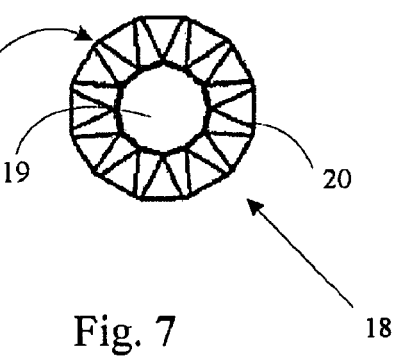
Fig. 7

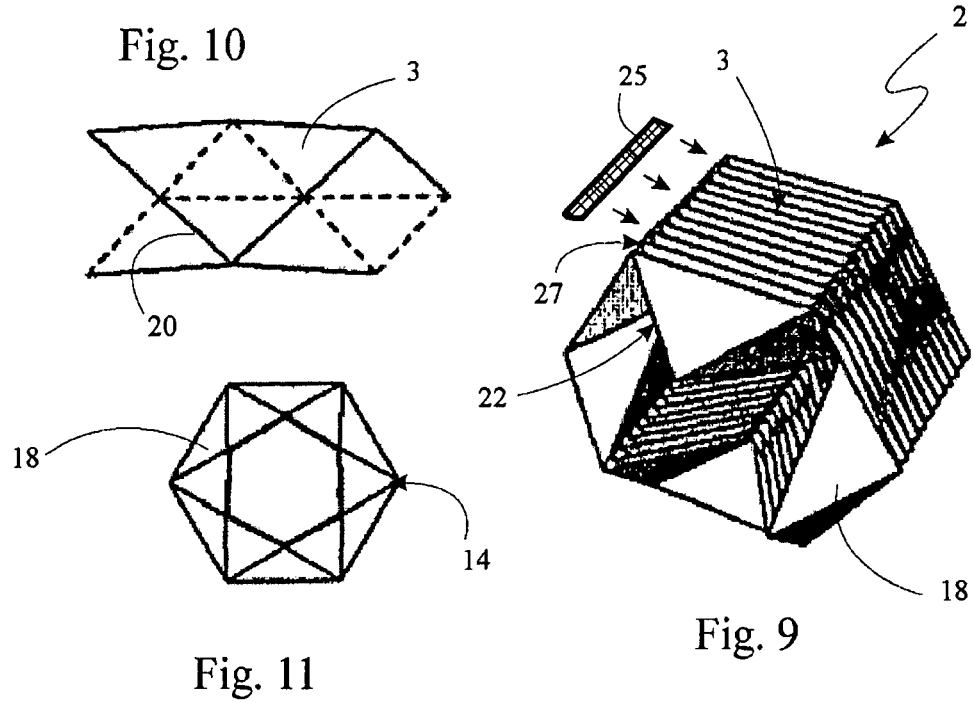
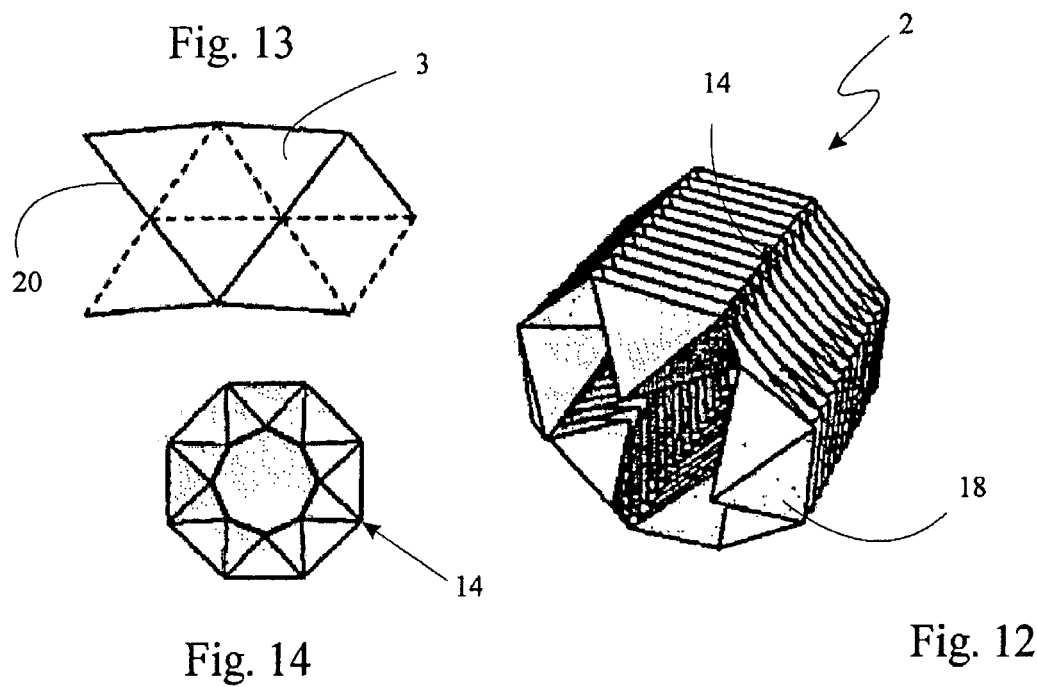

FILTER ELEMENT

BACKGROUND OF THE INVENTION

The present invention relates to a filter element comprising a tubular folded bellows or bag of folded filter material.

Filter elements of this type are utilized to filter air or also liquids, whereby the medium to be filtered passes through the filter material into the interior of the filter element and there is conveyed away, whereby the dirt particle load is collected on the filter material.

From U.S. Pat. No. 2,556,521 a round filter element is known in which a cylindrical filter material is compacted in the longitudinal direction of the cylinder and a filter bag is thereby formed. The compacted fold-blades of the folded bag thereby increase the effective filter surface of the filter element. At the axial ends of the filter element, the fold-blades form a flat flange surface on which plate-form closure covers are attached, which enclose the margins and seal off the interior of the folded bag. One of the closure covers is penetrated by a clean air duct. The clean air duct has a perforated construction and extends through the folded bag in the axial direction up to the opposite axial end. The entire filter element is inserted in a housing which has a connecting nipple for supplying the medium to be filtered, which is filtered by passing through the folded bag and reaches the interior of the clean air duct through the perforations.

From DE 27 25 437 A1 a round filter element with a radially profiled folded bag for cleaning dust-containing air is known in which at the axial ends of the folded bag is folded a flat flange projection onto which flat-surfaced end pieces with un-profiled surfaces are applied.

In many applications it is advantageous to be able to construct a filter element which is curved with respect to its longitudinal dimension in order to be able to use it in ducts having a correspondingly curved construction.

SUMMARY OF THE INVENTION

It is an object of the present invention to provide an improved filter element comprising a filter bag made of a folded filter material.

Another object of the invention is to provide a filter element which while maintaining high filter performance can be brought into any desired curved form.

A further object of the invention is to provide a filter element of folded filter material which can be produced at favorable cost.

These and other objects are achieved in accordance with the present invention by providing a filter element comprising a tubular filter bag of folded filter material, the bag having a plurality of fold blades adjacent each other in the longitudinal direction of the filter bag, and a closure cover attached at one axial end of the filter bag, in which the fold blades of the filter bag are provided with a combination of diagonal folds extending at an angle to each other such that the fold blades in the longitudinal direction of the filter bag extend back and forth and thereby form a three-dimensional crown structure, and at least the peripheral margin of the closure cover has a form corresponding to the crown structure of the fold blades and thereby forms a closed end for the crown structure of the filter bag.

In the filter element according to the invention the fold blades adjacent each other in the longitudinal direction of the folded bag are provided with a diagonal folds extending perpendicular to each other such that fold blades in the longitudinal direction of the folded bag extend back and forth and thereby form a three-dimensional crown structure. The fold blades engage in each other corresponding to the zig-zag course of the crown structure, whereby on the one hand a significantly enlarged filter surface is formed and on the other hand the filter bag can be creased or bent as needed in any desired direction. In order to close the filter bag a closure cover is provided which has at least in the vicinity of its margin a form which corresponds to the crown structure of the fold-blades and in this way forms a closed end of the crown structure of the filter bag.

With the closure cover formed in accordance with the invention, the filter bag can be securely sealed without any need to suitably modify the end for the connection with the closure cover. The filter element can therefore be produced a low cost and thus is suitable for mass production. Since it is not necessary to cut the filter bag, no scrap filter material occurs during production of the filter element, so that the filter element can be produced cost effectively. The three dimensional crown structure of the crown structure can furthermore be used during the assembly of the filter element in a housing since the contour of the closure cover fixes the rotational position of the filter element. The closure cover can advantageously be provided on the side facing away from the filter element with a supplementarily contoured surface which cooperates with an inner wall of the filter housing.

The closure cover can be constructed in plate form and can correspond with its crown structure to the elevations and depressions of the three-dimensional structure of the folded bag and thereby assures a problem-free installation in the filter housing.

The fold blades are advantageously folded in a polygonal crown structure so that a filter element is produced which has a higher dirt holding capacity due to the folding technique of the folded bag.

Simple production of the filter element can be achieved by adhesively bonding the closure cover to the folded bag. In one preferred embodiment of the invention, the closure cover is fixed to the folded bag with an attachment sleeve or jacket which overlaps at least with the contact region of the closure cover and the last fold blade in the axial end region of the folded bag in the longitudinal direction of the folded bag. The attachment of the fixing sleeve, which advantageously is composed of synthetic resin material and is attached to the exterior of the filter element, assures a complete seal with a secure connection of the closure cover with the margin of the folded bag. A secure connection with easy assembly of the closure cover results if the last fold blade in the vicinity of the axial end of the folded bag folds back in the longitudinal direction of the folded bag during the assembly and the closure cover is disposed on a peripheral margin of the folded back fold blade.

The closure cover advantageously is composed of synthetic resin material, which can be attached by a highly viscous liquid adhesive. Advantageous embodiments also include foamed closure covers, for example made of polyurethane (PU) foam. Also advantageous are metal closure covers, which are formed with the contemplated crown structure, for example as deep drawn parts.

The closure cover according to the invention can advantageously also be coupled with a bypass valve, a backflow check valve, or a combination of valve arrangements. An especially preferred embodiment in this regard is a closure cover of synthetic resin material in which a combination component comprised of a backflow check valve and a bypass valve is included.

In one advantageous embodiment of the invention, an air duct with an end formed corresponding to the crown structure of the folded bag is connected to the axial end of the folded bag lying opposite from the closure cover, whereby a secure connection of the air duct with the folded bag is possible without cutting the folded bag.

The folded bag can advantageously be comprised of a polygonally folded tube. Advantageously, the folded bag is folded from a web of filter material, which is stacked in folds and joined at the edges of the web of filter material to form a hollow body. In this way a rapid manufacture of the folded bag can be achieved, whereby the length of the filter web is matched to the size of the folded bag. The edges of the filter material, which are joined to produce the tubular form of the folded bag, are advantageously connected by a bead of adhesive. It is also possible to apply the bead of adhesive to the folded bag in the form contemplated for installation, so that the folded bag is fixed in its curved configuration.

BRIEF DESCRIPTION OF THE DRAWINGS

Working embodiments of the invention are explained in further detail hereinafter with reference to the accompanying drawings, in which:

FIGS. 3 to 5 are illustrations of a folded filter bag embodiment with a polygonal folded crown structure;

FIGS. 6 to 8 are illustrations of an alternative embodiment of a folded bag having a polygonal folded crown structure;

FIGS. 9 to 11 are illustrations of a further embodiment of a folded bag with a polygonal folded crown structure;

FIGS. 12 to 14 are illustrations of a further representative embodiment of a folded bag with a polygonal folded crown structure.

DETAILED DESCRIPTION OF PREFERRED EMBODIMENTS

Figure 1:
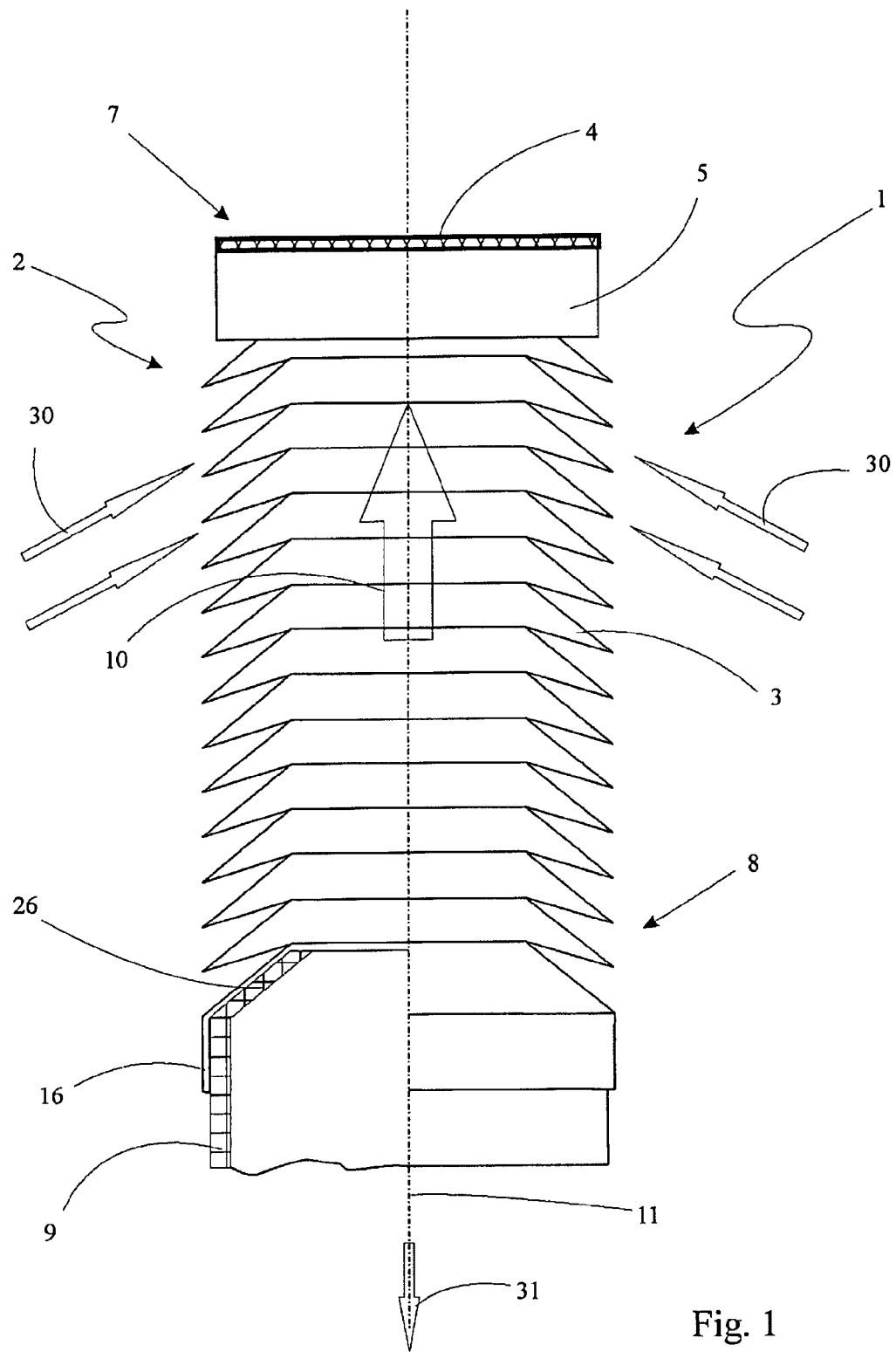
FIG. 1 is a schematic view of an air filter element according to the invention.

FIG. 1 shows an air filter element 1 with a tubular folded bag or bellows 2 of folded filter material, for example filter paper or a non-woven fleece. The round filter element 1 is inserted into a filter housing, whereby dirty air 30 is forced through the filter material into the interior of the folded bag to and from there clean air 31 is carried away through a clean air duct 9. The folded bag 2 is thereby closed off at one axial end 7 by a closure cover 4. The clean air duct 9 is connected at the opposite axial end 8 of the folded bag 2.

The folded bag 2 has a plurality of fold blades 3 adjacent each other in the longitudinal direction of the folded bag 2. The fold blades 3 are provided with a combination of diagonal folds extending at an angle to each other such that the fold blades 3 extend back and forth in the longitudinal direction 10 of the folded bag 2 and thereby form a three-dimensional crown structure 18. In the illustrated side view of the round filter element 1, it can be seen that the three-dimensionally structured fold blades 3 engage in one another in the longitudinal direction 10 of the folded bag 2.

Figure 2:
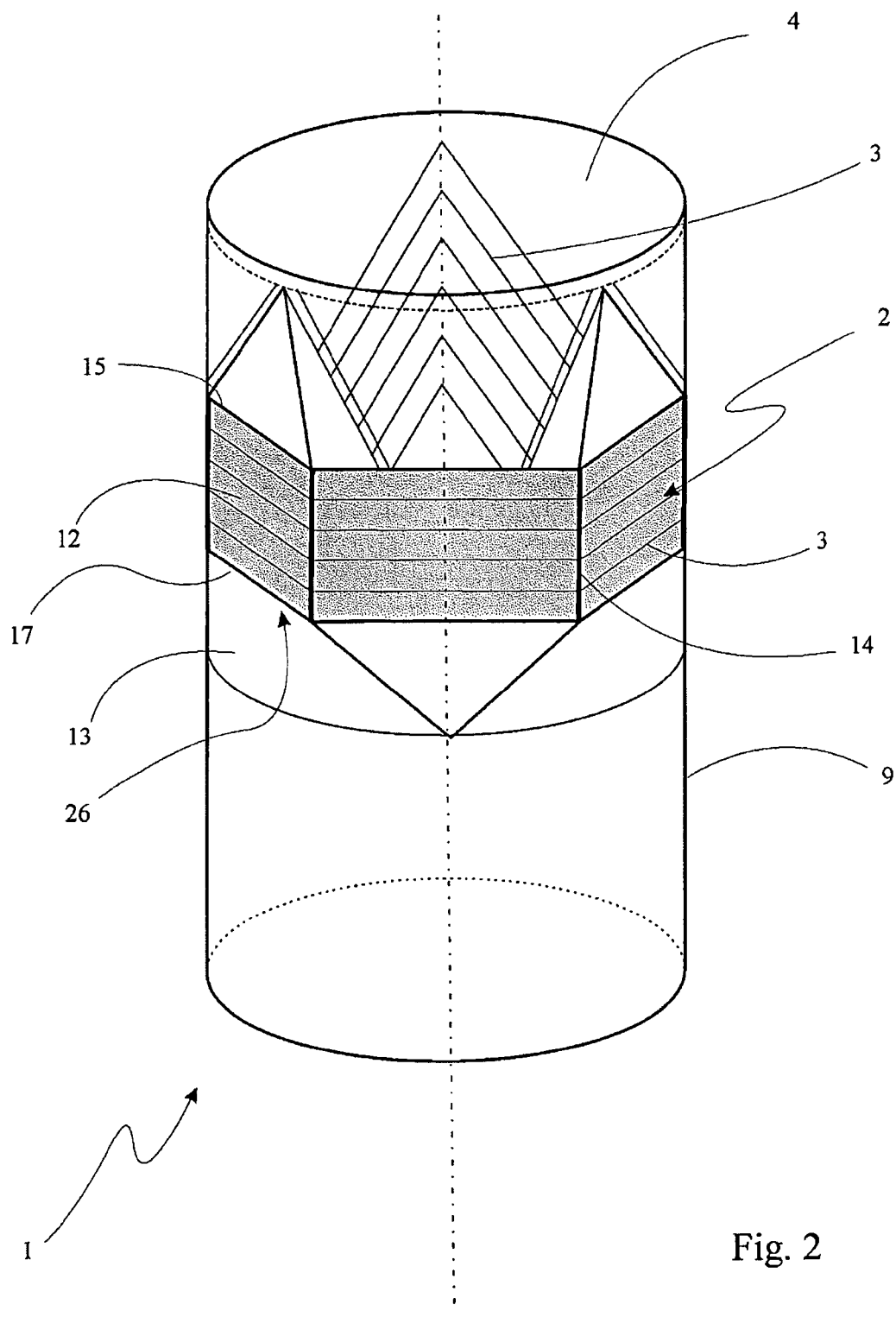
FIG. 2 is a perspective view of an assembled filter element according to the invention.

FIG. 2 shows a simplified illustration of the filter element 1, in which the folded bag is illustrated in shortened form for better viewability and an effective filter surface 12 of the folded bag is provided between contact regions 15 and 17. The end of the folded bag 2 is sealed by a closure cover 4, which has a form corresponding to the crown structure of the fold blades 3 of the folded bag 2 and interlockingly engages— as shown in broken lines—in the intervening spaces of the crown structure of the fold blades 3. A synthetic resin sleeve 5 (FIG. 1) encloses the closure cover 4 and extends over the contact point 15 of the closure cover 4 and over the folded bag 2.

This embodiment of the folded bag 2 has a hexagonal polygonal structure. At the longitudinal folds 14 of the end blades 3, which determine the polygonal structure, the synthetic resin is adhesively bonded to the filter element.

The clean air duct 9 is connected to the end of the folded bag 2 lying opposite from the closure cover 4. The end section 13 of clean air duct 9 has a form corresponding to the three-dimensional crown form of the folded bag 2, which in this embodiment is a hexagonal polygonal crown form, with which the clean air duct 9 interlockingly engages the crown structure of the folded bag 2. At the contact region 15 between the closure cover 4 and the folded bag 2 and the contact region 17 of the clean air duct 9 and the folded bag 2 and adhesive bead is applied for sealing and separating the unfiltered air region from the clean air region.

In FIGS. 3 to 5 a first working embodiment of a folded bag is shown in which the fold blades 3, which lie superposed over each other, are folded into a polygonal crown structure 18, which in this embodiment is a rectangular or square basic form. The fold blades illustrated sectionally in FIG. 4 are provided with diagonal folds 20 and 20a lying at an angle adjacent each other in the circumferential direction of the fold blade 3, whereby the diagonal folds 20 extend forwardly out of the plane of the drawing and lie above the plane of the diagonal folds 20a and represent a three-dimensional structure of the fold blades 3. Within the individual fold blades an annular space 19 (FIG. 5) is formed in which the filtered clean air is collected and ultimately can be withdrawn from the folded bag 2. Each filter blade 3 is bent or crimped by longitudinal fold 14 so that a square or rectangular base structure is created in the embodiment according to FIGS. 3 to 5 in which the fold blades 3 lie superposed over each other in the longitudinal direction of the folded bag 2 and thereby an easy-to-handle box-like filter component is created. The three-dimensionally folded structure of the last end blade lying at the top of the folded bag 2 forms a crown structure of the folded bag 2, in which forwardly projecting ears 21 and recessed sections of the folded blade 3 are formed in the circumferential direction of the folded bag 2.

FIGS. 6 to 8 depict a working embodiment of a folded bag 2 with a polygonal crown structure 18 in which the fold blades 3 have a plurality of longitudinal folds 14. The diagonal folds 20 meet each other at each longitudinal fold 14, whereby a crown structure which extends back and forth in the circumferential direction of the fold blade 3 is produced. The plurality of polygonal corners creates a folded bag 2 which more nearly approximates the form of a cylinder having a substantially round interior chamber 19 in which a tubular body can be inserted as needed. The diagonal folds 20 in the present embodiment are folded at a steeper angle than those in the embodiment of FIGS. 3 to 5, so that a crown structure 18 with steeper flanks is created at the fold blades 3, as can be seen at the end fold 6 at the axial end of the folded bag 2.

Folded bags 2 with a six- or eight-cornered polygonal structure are preferred. In FIGS. 9 to 11, a folded bag 2 is illustrated, which has fold blades 3 with six longitudinal folds 14 and thereby forms a crown structure 18 with six polygonal corners. The folded bag 2 can be folded from an endless strip or web of filter material, whereby after folding of the diagonal folds 20 and of the longitudinal folds 14 extending parallel to the edges, the edges 27 are joined together and the tubular folded bag 2 is thereby closed. In accordance with the arrangement of the longitudinal folds 14, there thereby results a polygonal base structure. In order to attach the filter material an adhesive bead 25 is applied at the seaming location of the edges 27. If a specific curved configuration of the folded bag is desired for the respective intended use of filter element, then the folded bag 2 can be bent to the corresponding longitudinal configuration and be fixed in the desired bended configuration by the adhesive bead 25 which is then applied. The manufacture of the folded bag 2 by joining the edges of a stretched filter material to each other is not limited to the six-cornered polygonal form according to FIGS. 9 to 11. Rather, the folded bag embodiments according to FIGS. 3 to 8 or 15 and 16 can also be produced from a folded stack of a stretched filter material which is creased at the locations which determine the polygonal base structure of the folded bag and is fixed or joined at the margins by applying an adhesive bead 25.

In FIGS. 12 to 14, a folded bag 2 illustrated with fold blades 3 having an eight-cornered crown structure 18. The crown structure 18 of the fold blades 3 forms an annular ring structure of adjacently positioned triangular surfaces at the visible end blade at the axial end of the folded bag 2, which are determined by the angular diagonal folds 20 impressed on the fold blades 3.

Figure 15:
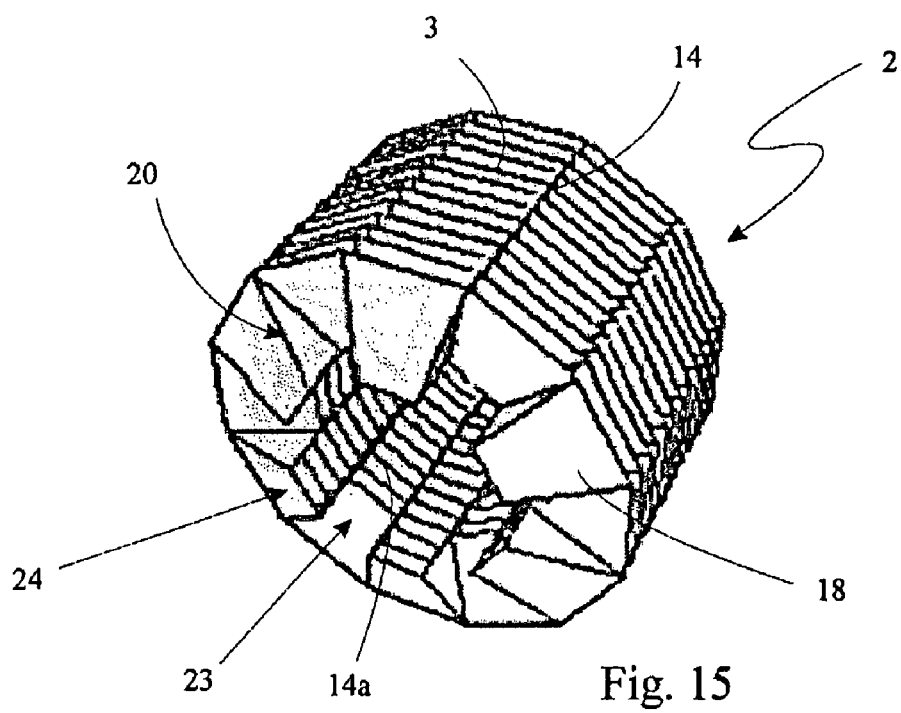
FIGS. 15 and 16 are perspective illustrations of further embodiments of a folded filter bag according to the invention.
Figure 16:
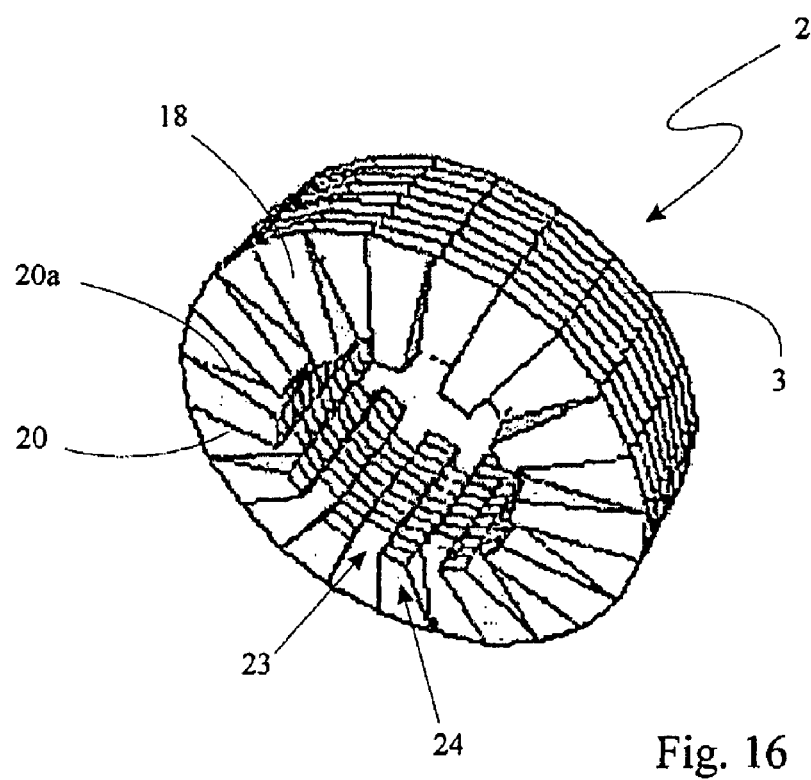

FIG. 15 and 16 show an embodiment of a folded bag with polygonal, three-dimensional crown structures of the fold blades 3 with a plurality of longitudinal folds 14 at the circumference of the folded bag 2. The diagonal folds 20 of the respective folded blade 3 are not arranged in directly alternating back and forth sequence; rather they are arranged in each case in successive pairs. In this way a crown structure 18 is created with recesses 23 and elevations 24 relative to a plane of the respective fold blades 3, whereby the respective surfaces of the elevations 24 and recesses 23 are connected by side surfaces extending substantially longitudinally of the folded bag 2. In this way a circumferentially extending crown structure 18 is created, which is like a castle battlement, in which an inwardly positioned main fold 3a of the fold blades 3 has sections between the polygonal corners lying offset relative to each other in the longitudinal direction of the folded bag 2. In the crown structure 18 with recesses 23 and elevations 24 illustrated in FIGS. 15 and 16, the folded bag can be sealed with a closure cover (FIG. 1 or 2) which is configured with depressions and elevations corresponding to the crown structure 18 at its margin which lies against the folded bag 2.

In a filter element according to FIG. 1, a folded bag with a three-dimensional crown structure 18 according to FIGS. 3 to 16 is closed at one axial end 7 by a closure cover 4 which has a form corresponding to the crown structure 8. The closure cover 4 thereby follows the contour of the crown structure and can be interlockingly inserted into the crown structure at the axial end 7 of the last fold blade and is adhesively bonded there to the folded bag 2. In the illustrated embodiment the closure cover 4 is fixed to the folded bag 2 with a fixing sleeve or jacket 5 which overlaps the contact region of the closure cover 4 and of the last fold blade in the vicinity of the axial end 7 in the longitudinal direction 10 of the folded bag 2.

In the assembly of the filter element 1, before the closure cover 4 with a crown structure is placed in position, the last fold blade after the axial end 7 of the folded bag is folded back in the longitudinal direction 10 of the folded bag, and then the closure cover 4 is placed on the margin or edge 22 (FIG. 3) of the folded back fold blade 3.

The closure cover 4 is composed of synthetic resin material so that after a periodic filter replacement operation, the entire filter element 1 can be incinerated without leaving any residue. The sleeve 5 for connecting the closure cover 4 to the folded bag 2 is composed of a synthetic resin material, whereby at least the edge region of the closure cover 4 and the fold blade 3 of the folded bag 2 are covered by the synthetic resin material of the sleeve and an air-tight connection is thereby created.

At the other axial end 8 of the folded bag 2, which lies opposite the axial end 7 closed by the closure cover 4, the clean air duct 9 is connected, whereby the end 26 of the clean air duct has a form corresponding to the crown structure of the folded bag 2 and thereby interlockingly engages in the crown structure of the folded bag. The clean air duct 9 is adhesively bonded to the folded bag 2, whereby the last fold blade 16 of the folded bag 2 is folded back and the clean air duct 9 can thereby be inserted into the folded bag 2. The filtered clean air can be conducted from the interior of the folded bag 2 through the clean air duct 9 in the direction of arrow 31 for further use.

The folded bag 2 in the illustrated working embodiment is constructed symmetrically with respect to a longitudinal axis 11. The fold blades 3 of the folded bag 2 thereby permit any desired bending of the folded bag in its longitudinal direction 10, whereby a three-dimensional crown structure of the interengaging fold blades 3 present the largest possible filter surface for the dirty air 30.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element comprising a tubular filter bag of folded filter material, said bag having a plurality of fold blades adjacent each other in a longitudinal direction of the filter bag, and a closure cover attached at one axial end of the filter bag for sealing the axial end of the filter bag, wherein the fold blades of the filter bag are provided with a combination of diagonal folds extending at an angle to each other such that the fold blades in the longitudinal direction of the filter bag extend back and forth and thereby form a three-dimensional crown structure defining alternating recesses and elevations relative to a plane of the fold blades, and at least the peripheral margin of the closure cover has a form corresponding to the crown structure of the fold blades and thereby forms a closed end for the crown structure of the filter bag.

2. A filter element according to claim 1, wherein the fold blades are folded in a polygonal crown structure.

3. A filter element according to claim 2, wherein the closure cover is adhesively bonded to the filter bag.

4. A filter element according to claim 1, wherein the closure cover is attached to the filter bag by a fixing sleeve which overlaps at least a contact region of the closure cover and the last fold blade in the vicinity of the axial end of the filter bag in the longitudinal direction of the filter bag.

5. A filter element according to claim 4, wherein the fixing sleeve is composed of synthetic resin material and is attached to the exterior of the filter element.

6. A filter element according to claim 1, wherein the last fold blade in the vicinity of the axial end of the filter bag in the longitudinal direction of filter bag is folded back, and the closure cover is disposed on a margin of the folded back fold blade.

7. A filter element according to claim 1, wherein the closure cover is composed of a synthetic resin material.

8. A filter element according to claim 1, wherein an air duct having an end formed corresponding to the crown structure of the filter bag is connected to an end of the filter bag which lies axially opposite from the closure cover.

9. A filter element according to claim 1, wherein the filter bag is comprised of a polygonal folded tube.

10. A filter element according to claim 1, wherein the filter bag is folded from a strip of filter material which is stacked in fold lades and is joined at lateral margins of the strip of filter material to form a hollow tube.

11. A filter element according to claim 10, wherein the lateral edges of the filter material are joined by a bead of adhesive.

\* \* \* \* \*